United States Patent [19]

Melman et al.

[11] Patent Number: 4,820,018

[45] Date of Patent: Apr. 11, 1989

[54] OPTICAL FIBER FOR LIGHT AMPLIFICATION

[75] Inventors: Paul Melman, Newton; Mark L. Dakss, Sudbury, both of Mass.

[73] Assignee: GTE Laboratories Incorporated, Waltham, Mass.

[21] Appl. No.: 114,927

[22] Filed: Oct. 30, 1987

[51] Int. Cl.[4] .............................................. G02B 6/22
[52] U.S. Cl. .............................. 350/96.33; 350/96.29; 350/96.34
[58] Field of Search ............... 350/96.15, 96.29, 96.30, 350/96.31, 96.33, 96.34

[56] References Cited

U.S. PATENT DOCUMENTS

| | | | |
|---|---|---|---|
| 3,884,550 | 5/1975 | Maurer et al. | 350/96.30 |
| 4,306,767 | 12/1981 | Kawachi et al. | 350/96.33 |
| 4,401,364 | 8/1983 | Mochizuki | 350/96.16 |
| 4,435,040 | 3/1984 | Cohen et al. | 350/96.33 |
| 4,616,898 | 10/1986 | Hicks, Jr. | 350/96.33 X |

Primary Examiner—John D. Lee
Assistant Examiner—Phan Heartney
Attorney, Agent, or Firm—James J. Cannon, Jr.

[57] ABSTRACT

A fiber, with enhanced stimulated Raman scattering for use in light amplification, transmits light wave energy in a single mode. The fiber includes a cylindrical core of light transmitting material doped with a substantial concentration of $GeO_2$, an inner cladding of light transmitting material doped with a sizable concentration of $GeO_2$ (but less than the substantial concentration) surrounding the core, and an outer cladding of $GeO_2$-free material surrounding the inner cladding.

6 Claims, 1 Drawing Sheet

OPTICAL FIBER FOR LIGHT AMPLIFICATION

BACKGROUND OF THE INVENTION

1. Field of the Invention

This invention relates to optical fiber, and, in particular, to an optical fiber configuration for enhanced light amplification by stimulated Raman scattering. Accordingly, it is a general object of this invention to provide new and improved optical fibers of such character.

2. General Background

The Raman effect, as defined by the American Heritage Dictionary of the English Language, 1969, is: Physics. The alteration in frequency and random alteration in phase of light scattered in a material medium. [Discovered by Sir Chandrasekhara Venkata Raman (born 1888), Indian physicist.]

Light amplification by stimulated Raman scattering in fibers has been reported in publications including Y. Aoki et al., "Efficient Backward and Forward Pumping cw Amplification for InGaAs Laser Light in Silica Fibers", *Electronics Lett.*, 19, 1983, pp. 620–622. Amplification factors exceeding 20 dB have been obtained in single mode fibers of several kilometers length with cw pump powers of typically one watt. The need for such large pump powers is a significant disadvantage.

The developed dB gain in the amplifier is inversely proportional to the area of the pump beam, generally proportional to the pump power and to effective length, and proportional to the Raman cross-section (a measure of the strength of the Raman interaction for the material) within the area of the pump beam.

The effective length $L_{eff}$ is equal to $(1/\alpha)(1-e^{-\alpha L})$ where L=actual length in km and $\alpha=1/4.3$ (fiber loss in dB/km).

The prior art has utilized silica fibers with $GeO_2$-doped cores. The Raman interaction in the fiber core increases with increasing germanium content, approximately proportional to the germanium concentration (the interaction in $GeO_2$ is nine times stronger than that in $SiO_2$). However, the $GeO_2$ concentration was limited by the requirement that the fiber propagate only a single mode, since increasing such concentration increases core-cladding index difference and thus the number of modes. The core diameter can be decreased, decreasing the mode field diameter and increasing the Raman gain as in the fibers of the above-cited Aoki et al. reference but this can only be done to a limited extent because of losses due to increased fiber strain [B. J. Ainslie et al. "Monomode fiber with ultra-low loss and Minimum Dispersion at 1.55 $\mu$m", Journal Electronics Letters, Vol. 18, no. 19, 1982, pp. 842–844] and excess losses in splicing to conventional fiber, thus limiting the increase in germanium doping. The previous art used fibers with $SiO_2$ claddings. Disadvantageously, the propagating mode has a significant amount of light (tens of percent, typically) in the cladding, where it does not undergo Raman enhancement due to a $GeO_2$ dopant.

OBJECTS AND ADVANTAGES

Another object of this invention is to provide a new and improved optical fiber having a profile that permits single mode operation with a much larger $GeO_2$ concentration (e.g., 15% or more) than prior optical fibers.

Still another object of this invention is to provide a new and improved optical fiber in which $GeO_2$ exists in the core and cladding so that the full light distribution occupies enhanced-Raman regions.

An enhancement in the Raman cross-section advantageously decreases the required pump power.

SUMMARY OF THE INVENTION

In accordance with one aspect of the invention, an optical fiber for transmitting light wave energy in a single mode includes a cylindrical core of first light transmitting material, an inner cladding of second light transmitting material surrounding the core, and an outer cladding of material surrounding the inner cladding. The core is doped with a substantial concentration of $GeO_2$ at x mol percent. The inner cladding is doped with a sizable concentration of $GeO_2$ at y mol percent. The outer cladding is substantially free of $GeO_2$. The value of x is greater than y.

With certain features of the invention, y is at least 15. The value of x can be 20 and y can be 15. Then, a $GeO_2$-enhanced Raman effect can be produced whereby light amplification by stimulated Raman scattering occurs.

In accordance with another feature of the invention, a portion of the inner cladding contiguous to the outer cladding contains a tapered amount of $GeO_2$ ranging from y mol percent to zero mol percent.

The core diameter can also be reduced, giving further increases in the Raman gain.

BRIEF DESCRIPTION OF THE DRAWING

Other objects, advantages, and features of this invention, together with its construction and mode of operation, will become apparent from the following description, when read in conjunction with the accompanying drawing, in which.

DESCRIPTION OF PREFERRED EMBODIMENT(S)

Figure 1:
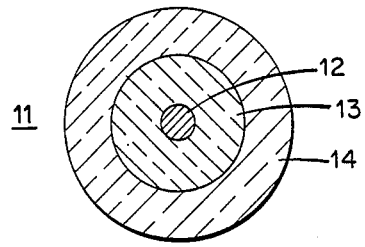
FIG. 1 is a cross-sectional view of an optical fiber (greatly enlarged) in accordance with one embodiment of this invention.

The invention, as depicted in cross-section in FIG. 1, includes an optical fiber 11 having an inner cylindrical core 12 of light transmitting material such as silica, doped with a substantial concentration of germanium dioxide ($GeO_2$). An inner cladding 13 of light transmitting material, such as silica, surrounds the core 12. The cladding 13 is doped with a sizable concentration of $GeO_2$. An outer cladding 14 of material, which may or may not be light transmissive, substantially free of $GeO_2$, surrounds the inner cladding 13.

The substantial concentration of $GeO_2$ in the core 12 is present in an amount of x mol percent. The sizable concentration of $GeO_2$ in the inner cladding 13 is present in an amount of y mol percent, where x is greater than y.

y is at least 15. Thus, when y is 15, x can be 20. With such a y value, a $GeO_2$-enhanced Raman effect is produced, whereby enhanced light amplification by stimulated Raman scattering is produced.

Figure 2:
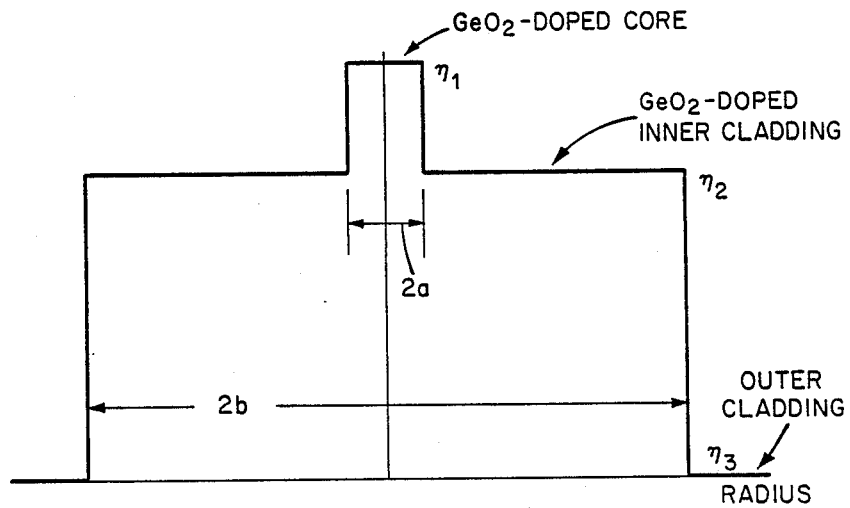
FIG. 2 is an index profile of an optical fiber in accordance with this invention.
Figure 3:
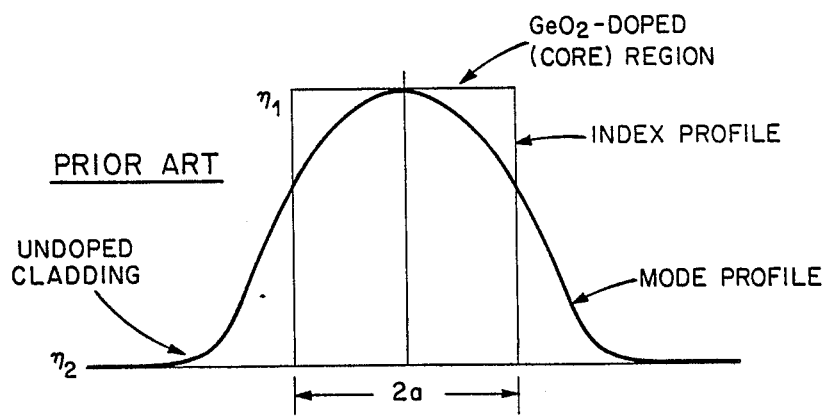
FIG. 3 is an index profile of conventional, stepindex fiber and mode profile normalized to the index profile, of the prior art.

The fiber design of this invention has the index profile shown in FIG. 2. The fiber 11 contains a $GeO_2$-doped inner cladding 13 and a $GeO_2$-doped core 12. Noting that FIGS. 2 and 3 are not drawn to the same scale, the core 12 of FIG. 2 has approximately the same width 2a as that in the conventional, prior art type depicted in FIG. 3. The inner cladding 13 has a width 2b sufficiently larger than that of the core so that the light energy is contained in the core and inner cladding.

The inner cladding 13 is doped with a sizable $GeO_2$ concentration (e.g., 15 mol percent) and the core 12 has a still larger concentration of $GeO_2$ (e.g., 20 mol percent) so that the index step $\eta_1 - \eta_2$ is about the same as that of the conventional, prior art fiber (FIG. 3). Thus, the optical fiber 11 of this invention propagates only a single mode in the core 12 of about the same beam size as that of a conventional fiber. Also, both the core 12 and the inner fiber 13 provide a $GeO_2$-enhanced Raman effect. Enhancement of the Raman cross-section by a factor of three is achievable, providing a reduction in pump power by the same factor.

Generally, this invention utilizes larger core 12 dopant concentration permitted by the utilization of the inner cladding 13 (index profile "pedestal") and the ability to utilize dopants in both the inner cladding 13 and core 12.

Various modifications can be performed without departing from the spirit and scope of this invention. For example, light amplifiers, as well as fiber Raman lasers with reduced threshold, can be made with such a fiber. The index jump region at the outside edge of the inner cladding 13 can be tapered to minimize any stress effects in the perform collapse step due to the concentration change. Fibers utilizing other nonlinear or dopant-dependent effects can have enhancements when designed using a similar concept.

What is claimed is:

1. An optical fiber for transmitting light wave energy in a single mode comprising:
   a cylindrical core of a first light transmitting material, doped with a substantial concentration of $GeO_2$ at x mol percent;
   an inner cladding of a second light transmitting material, doped with a sizable concentration of $GeO_2$ at y mol percent, surrounding said core; and
   an outer cladding of material, substantially free of $GeO_2$, surrounding said inner cladding.
   wherein x is greater than y; and
   wherein a $GeO_2$-enhanced Raman effect is produced.

2. The optical fiber as recited in claim 1 wherein y is at least 15.

3. The optical fiber as recited in claim 2 wherein x=20 and y=15.

4. The optical fiber as recited in claim 2 whereby enhanced light amplification by stimulated Raman scattering is produced.

5. The optical fiber as recited in claim 1 wherein said inner cladding is contiguous to said outer cladding, and wherein a portion of said inner cladding contiguous to said outer cladding contains a transitional portion of $GeO_2$, tapering from y mol percent to zero mol percent.

6. In combination, an optical fiber comprising:
   a silica core doped with substantial concentration of $GeO_2$;
   an inner silica cladding doped with a sizable concentration of $GeO_2$, but less than said substantial concentration; and
   an outer silica cladding contiguous with said inner cladding; and
   wherein a $GeO_2$-enhanced Raman effect is produced.

* * * * *